United States Patent [19]

Takahashi et al.

[11] Patent Number: 4,486,583

[45] Date of Patent: Dec. 4, 1984

[54] HEAT-RESISTANT RESIN FROM AROMATIC CYANAMIDE COMPOUND AND AROMATIC AMINE COMPOUND

[75] Inventors: Akio Takahashi, Hitachiohta; Masahiro Ono, Hitachi; Ritsuro Tada, Mito; Motoyo Wajima; Hirosada Morishita, both of Hitachi, all of Japan

[73] Assignee: Hitachi, Ltd., Tokyo, Japan

[21] Appl. No.: 525,700

[22] Filed: Aug. 23, 1983

[30] Foreign Application Priority Data

Aug. 23, 1982 [JP] Japan ................. 57-144736

[51] Int. Cl.³ .............................................. C08G 73/08
[52] U.S. Cl. ........................... 528/422; 428/411.1; 528/172; 528/210; 528/220; 528/363; 528/391; 528/367
[58] Field of Search .............. 528/422, 210, 391, 220, 528/363, 172, 367

[56] References Cited

FOREIGN PATENT DOCUMENTS 1322332 7/1973 United Kingdom ................ 528/422

*Primary Examiner*—Harold D. Anderson
*Attorney, Agent, or Firm*—Antonelli, Terry & Wands

[57] ABSTRACT

A polymer which has excellent heat resistance and mechanical properties which is useful as a molding material, contains the structural units having the following formulae [I] and [II]:

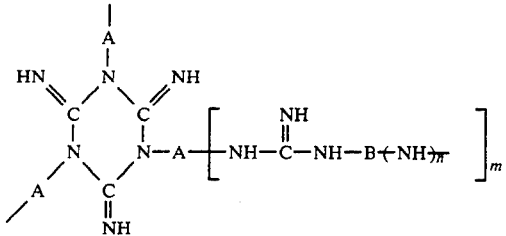

(i.e., a polymer unit having an isomelamine ring)

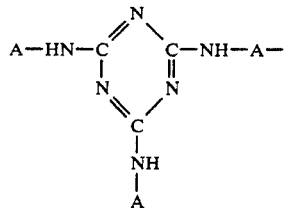

(i.e., a polymer unit having a normal melamine ring)

wherein A and B each represents an at least divalent organic group having at least one aromatic ring such as a diphenyl ring; and m and n each represents a number of at least 1. The polymer is used in the form of a solution or varnish as an impregnating, laminating, bonding or film-forming coating or prepreg-forming varnish. A resin composition for forming the polymer contains an aromatic cyanamide compound and an aromatic amine which are reacted to form a prepolymer which, upon heating, is converted into a cured polymer having the structural units of formulae [I] and [II].

13 Claims, No Drawings

HEAT-RESISTANT RESIN FROM AROMATIC CYANAMIDE COMPOUND AND AROMATIC AMINE COMPOUND

BACKGROUND OF THE INVENTION

1. Field of the Invention

The present invention relates to a resin having excellent heat resistance and mechanical properties, a thermosetting composition affording said resin and a prepolymer obtained by pre-reacting said composition.

2. Description of the Prior Art

As resinous molding materials having a thermal resistance of class H, addition-polymerization type polyimides such as bismaleimide have been well known. Bismaleimide is used in combination with a diamine or both diamine and epoxy resin in many cases. The specification of British Pat. No. 1,322,332 discloses aromatic dicyanamide homopolymers but they cannot be used as molding materials or starting materials for films, coating agents or prepreg materials, since they have only a poor flexibility, though their heat resistance is superior to that of the polyimide.

SUMMARY OF THE INVENTION

An object of the present invention is to provide a thermosetting polymer having excellent heat resistance and mechanical properties, a thermosetting composition affording said polymer and a prepolymer obtained from said composition.

The heat-resistant resins of the present invention are characterized by containing the following chemical structural units [I] and [II]:

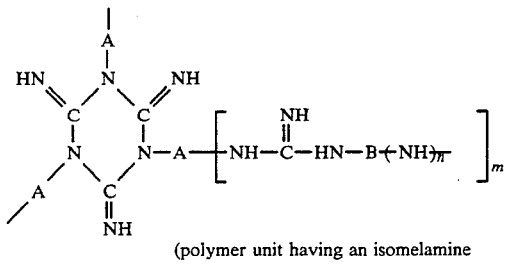

(polymer unit having an isomelamine ring)

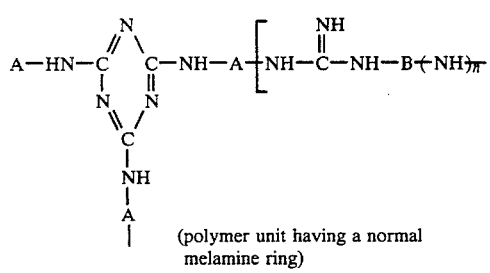

(polymer unit having a normal melamine ring)

wherein A represents an at least divalent organic group having at least one aromatic ring, B represents an at least divalent organic group having at least one aromatic ring and m and n represent each a number of at least 1. The thermosetting compositions affording the above-mentioned resins are characterized by containing the following components (a) and (b):

(a) an aromatic cyanamide compound of the general formula [III]:

$$NCHN-A-NHCN)_m \quad [III]$$

wherein A represents a polyvalent organic group having at least one aromatic ring and m represents a number of at least 1, and (b) an aromatic amine compound of the general formula [IV]:

$$H_2N-B-NH_2)_n \quad [IV]$$

wherein B represents a polyvalent organic group having at least one aromatic ring and n represents a number of at least 1.

According to the present invention, an aromatic cyanamide compound is reacted with an aromatic amine compound to form a prepolymer comprising mainly a chemical structure of the following formula [V]:

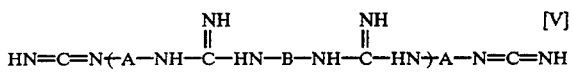

This is an example wherein a dicyanamide compound and a diamine compound are used. The above-mentioned prepolymer has excellent moldability and film-forming capacity. Upon heating, this prepolymer is fused and cured according to a mild reaction. Therefore, this prepolymer is suitable for use as a molding material. As a matter of course, it is also useful as an impregnating varnish, laminating varnish and coating agent. Finally, the prepolymer is converted into a cured product comprising the above-mentioned structural units [I] and [II]:

As the aromatic cyanamide compounds of the above general formula [III] used in the present invention, there may be mentioned, for example, m-phenylene dicyanamide, p-phenylene dicyanamide, 4,4'-dicyanamidodiphenylmethane, 2,2'-bis(4-cyanamidophenyl)propane, 4,4'-dicyanamidodiphenyl oxide, 4,4'-dicyanamidodiphenyl sulfone, bis(4-cyanamidophenyl)phosphine oxide, bis(4-cyanamidophenyl)phenylphosphine oxide, bis(4-cyanamidophenyl)methylamine, 1,5-dicyanamidonaphthalene, m-xylylene dicyanamide, 1,1-bis(p-cyanamidophenyl)phthalan, p-xylylene dicyanamide, hexamethylene dicyanamide, 6,6'-dicyanamido-2,2'-dipyridyl, 4,4'-dicyanamidobenzophenone, 4,4'-dicyanamidoazobenzene, bis(4-cyanamidophenyl)phenylmethane, 1,1-bis(4-cyanamidophenyl)cyclohexane, 1,1-bis(4-cyanamido-3-methylphenyl)-1,3,4-oxadiazole, 4,4'-dicyanamidodiphenyl ether, 4,4'-bis(p-cyanoamidophenyl)-2,2-dithiazole, m-bis(4-p-cyanamidophenyl-2-thiazolyl)benzene, 4,4'-dicyanamidobenzanilide, 4,4'-dicyanamidophenyl benzoate, 2,2'-bis[4-(4-cyanamidophenoxy)phenyl]propane, 2,2'-bis[3-methyl-4-(4-cyanamidophenoxy)phenyl]propane, 2,2-bis[3-ethyl-4-(4-cyanamidophenoxy)phenyl]propane, 2,2-bis[3-propyl-4-(4-cyanamidophenoxy)phenyl]propane, 2,2-bis[3-isopropyl-4-(4-cyanamidophenoxy)phenyl]propane, bis[4-(4-cyanamidophenoxy)phenyl]methane and cyanamido-terminated sulfone ether oligomers of the general formula [VI]:

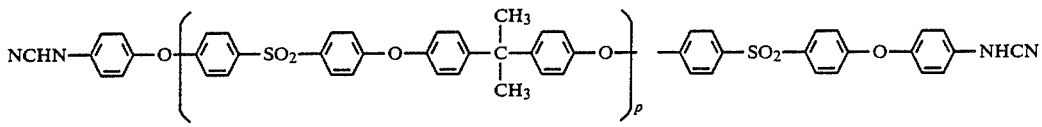

wherein p represents a number of 0 to 3. The aromatic cyanamide compounds are used either alone or in the form of a mixture of them. Further, aromatic cyanamide compounds having at least 2 cyanamido groups obtained by pre-reacting the above-mentioned aromatic cyanamide compounds under heating to form isomelamine rings partially may also be used. The aromatic cyanamide compounds are used in the present invention because the aromatic cyanamide compounds have an excellent heat resistance and, as compared with aliphatic cyanamide prepolymers, the aromatic cyanamide prepolymers have a prolonged pot life irrespective of the presence or absence of the solvent. In these cyanamide compounds, those having up to 6 cyanamido groups (—NHCH) are particularly preferred with respect to molding properties. The aromatic cyanamide compounds are used either alone or in the form of a mixture of two or more of them.

As the aromatic amine compounds of the above general formula [IV], there may be mentioned, for example, aniline, m-phenylenediamine, p-phenylenediamine, 4,4'-diaminodiphenylmethane, 2,2'-bis(4-aminophenyl)propane, benzidine, 4,4'-diaminodiphenyl oxide, 4,4'-diaminodiphenyl sulfone, bis-(4-aminophenyl)methylphosphine oxide, bis(4-aminophenyl)phenylphosphine oxide, bis(4-aminophenyl)methylamine, 1,5-diaminonaphthalene, m-xylylenediamine, 1,1-bis(p-aminophenyl)phthalan, p-xylylenediamine, hexamethylenediamine, 6,6'-diamino-2,2'-dipyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazolo(4,5-d)thiazole, 5,5=-di(m-aminophenyl)-(2,2')-bis(1,3,4-oxadiazolyl), 4,4'-diaminodiphenyl ether, 4,4'-bis(p-aminophenyl)-2,2'-diazole, m-bis(4-p-aminophenyl-2-thiazolyl)benzene, 4,4'-diaminobenzanilide, 4,4'-diaminophenyl benzoate, N,N'-bis(4-aminobenzyl)-p-phenylenediamine, 4,4'-methylenebis(2-dichloroaniline), benzoguanamine, methylguanamine, 1,2,4-triaminobenzene, 1,3,5-triaminobenzene, 2,4,6-triaminotoluene, 2,4,6-triamino-1,3,5-trimethylbenzene, 2,4,4'-triaminodiphenyl ether, 2,4,4'-triaminodiphenylmethane, 2,4,4'-triaminodiphenyl sulfone, 2,4,4'-triaminobenzophenone, 3,5,3',5'-tetraaminobenzophenone, 1,2,4,5-tetraaminobenzene and aniline resins of the general formula [VII]:

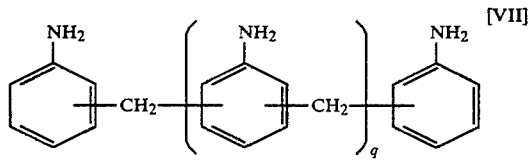

wherein q represents a number of 0, 1 to 6. The aromatic amine prepolymers have a far longer pot life than that of aliphatic amine prepolymers as in case of the cyanamide compounds. In the above-mentioned aromatic cyanamide compounds, those having up to 5 amino groups (—NH₂) are particularly preferred with respect to molding properties. The aromatic amine compounds are used either alone or in the form of a mixture of two or more of them.

The ratio of the aromatic amine compound to the aromatic cyanamide compound may be selected without any limitation in the present invention. The molar ratio is, however, preferably 1/1 to 1/50, particularly ½ to 1/40. As the amount of the amine compound is increased, melt-molding properties of the prepolymer are improved. Particularly, the melting point of the prepolymer is lowered to facilitate the melt-molding at a low temperature and also the control of the curing reaction. Accordingly, bubble inclusion is controlled in the molding step and a difference in curing rate between an outer layer and an inner layer of the molding is reduced. The pot life of the prepolymer is prolonged as the amount of the amine compound is reduced.

When the resin composition of the present invention is heated in the form of a solution in an organic solvent or a varnish or in the absence of the solvent, a reaction takes place to cure the same. In the absence of the solvent, a so-called fusion reaction occurs. In case the solvent is used, the reactants are preferably first heated to about 50° to 150° C. and then to about 150° to 220° C. In the fusion reaction, the reactants may be heated directly to a relatively high temperature of about 150° to 220° C. To obtain the prepolymer, the heating is stopped after the reaction mixture has grown into B stage. When the reaction is carried out in a solvent, the heating is stopped before a solid (cured product) is precipitated. It is particularly preferred to stop the reaction before the product loses its solubility in a low-boiling solvent such as methyl ethyl ketone or acetone. According to the present invention, the cured product may be formed directly without stopping the reaction in the B stage. As the solvent, there may be used, for example, methyl ethyl ketone, methyl acetyl ketone, 2-methoxyethanol, 2-(methoxymethoxy)ethanol, 2-isopropoxyethanol, 2-(ethoxyethoxy)ethanol, dioxane, dimethyldioxane, monopropylene glycol methyl ether, N,N-dimethylformamide, N,N-dimethylacetamide and N-methyl-2-pyrrolidone. They may be used either alone or in the form of a mixture of two or more of them. Particularly preferred solvents are methyl ethyl ketone, 2-methoxyethanol, N,N-dimethylformamide, N-methyl-2-pyrrolidone and dioxane.

For accelerating the reaction, a curing catalyst such as those used for curing maleimides or epoxy resins may also be used. As particular examples of the catalysts, there may be mentioned imidazole compounds such as 2-methylimidazole, 2-ethyl-4-methylimidazole, 2-ethylimidazole, 2-isopropylimidazole, 2-undecylimidazole, 2-heptadecylimidazole, 2-phenylimidazole and 2,4-dimethylimidazole as well as their azine derivatives, onium salts, trimellitic acid salts and nitrilethyl derivatives, tetraphenylphosphonium tetraphenylborate, tetraphenylammonium tetraphenylborate, tetrabutylammonium tetraphenylborate and tetramethylammonium fluoride. These curing catalysts are used preferably in an amount of up to 0.1 wt. % based on the total composition in general.

Known inorganic fillers, flame retardants, flexibilizers, antioxidants, pigments, coupling agents and releasing agents may be incorporated in the resin composition of the present invention.

The resin composition of the present invention is used in the form of a solution in an organic solvent (varnish) as an impregnating, laminating, bonding, film-forming, coating or prepreg-forming varnish. The resin composition containing no solvent may be used as a molding powder. As the organic solvents, there may be used various solvents such as acetone, methyl ethyl ketone, methyl cellosolve, N-methyl-2-pyrrolidone, N,N-dimethylformamide and N,N-dimethylacetamide. The resin composition of the present invention may be kept in the B stage by the preliminary reaction.

EXAMPLES

Example 1

(a)

4,4'-dicyanamidodiphenylmethane: 80 parts by weight (0.32 mol)

(b)

4,4'-diaminodiphenylmethane: 20 parts by weight (0.10 mol)

The above two components were dissolved in 100 parts by weight of methyl ethyl ketone and were pre-reacted at 60° to 80° C. for 60 min to form a prepolymer. The resulting varnish had a pot life (a time required until the viscosity was increased 10-fold; the same shall apply hereinafter) of 3 weeks.

Example 2

(a)

4,4'-dicyanamidodiphenyl ether: 70 parts by weight (0.28 mol)

(b)

4,4'-diaminodiphenylmethane: 30 parts by weight (0.15 mol)

Component (a) was dissolved in 100 parts by weight of methyl ethyl ketone. The solution was heated to 60° to 80° C. for 30 min to obtain a prepolymer. Component (b) was added to the prepolymer and the mixture was pre-reacted at 60° to 80° C. for 30 min to obtain another prepolymer.

Example 3

(a)

2,2'-bis[4-(4-cyanamidophenoxy)phenyl]propane: 90 parts by weight (0.20 mol)

(b)

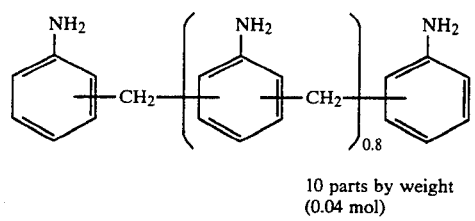

10 parts by weight
(0.04 mol)

The above two components were dissolved in 100 parts by weight of methyl cellosolve and were pre-reacted at 80° to 100° C. for 50 min to obtain a prepolymer.

Example 4

(a)

4,4'-dicyanamidodiphenylmethane: 95 parts by weight (0.38 mol)

(b)

4,4'-diaminodiphenylmethane: 5 parts by weight (0.03 mol)

The above two components were dissolved in 70 parts by weight of methyl cellosolve and were pre-reacted at 100° C. for 50 min. The resulting varnish was poured into a large quantity of cold water. A prepolymer thus obtained as a precipitate was filtered out and dried at about 50° C. in vacuum to obtain a resinous product. The product could be fusion-molded even after storage for longer than three months.

Example 5

(a)

3,3'-dicyanamidodiphenyl sulfone: 70 parts by weight (0.23 mol)

(b)

4,4'-diaminodiphenylmethane: 20 parts by weight (0.10 mol)

(c)

benzoguanamine: 10 parts by weight (0.05 mol)

The above three components were pre-reacted in 70 parts by weight of methyl cellosolve at 100° C. for 60 min. The resulting prepolymer solution was poured into a large quantity of cold water. A prepolymer thus obtained as a precipitate was filtered out and dried at about 50° C. in vacuum to obtain a resinous product.

Conventional Example 1

100 parts by weight of the same cyanamide compound as in Example 1 was dissolved in 100 parts by weight of methyl ethyl ketone. The pre-reaction was carried out at 60° to 80° C. for 60 min to obtain a prepolymer solution.

Conventional Example 2

100 parts by weight of the same cyanamide compound as in Example 2 was dissolved in 100 parts by weight of methyl ethyl ketone. The pre-reaction was carried out at 60° to 80° C. for 30 min to obtain a prepolymer solution.

Conventional Example 3

100 parts by weight of the same cyanamide compound as in Example 3 was dissolved in 100 parts by weight of methyl cellosolve. The pre-reaction was carried out at 80° to 100° C. for 50 min to obtain a prepolymer solution.

A glass cloth having 0.1 mm thickness which had been treated with aminosilane (a coupling agent) was impregnated with each of the prepolymer solutions (hereinafter referred to as varnishes) obtained in Examples 1 to 3 and Conventional Examples 1 to 3 and then dried at 100° to 120° C. for 20 min to obtain a prepreg having a resin content of 50 to 55 wt. %. The prepregs obtained from the products of Examples 1 to 3 were transparent and had an excellent appearance, while those obtained from the products of Conventional Examples 1 to 3 were opaque and powdery material adhered to their surfaces.

Three sheets of each variety of the thus formed prepregs were put together to form a laminate. The laminate was heated to 170° C. for 30 min and then to 220° C. for 120 min under a pressure of 20 kg/cm² to obtain a laminate having about 1 mm thickness. The laminates of Examples 1 to 3 were colorless and highly transparent, while the conventional laminates were wholly milky and included bubbles therein.

Each of the resinous products obtained in Examples 4 and 5 was charged in a mold at 170° C. and heated for 30 min to obtain a colorless, transparent resin plate having 2 mm thickness. The resin plates were postcured at 220° C. for 2 h.

The resins were taken out from the resin plates of Examples 1 to 5 which had been cured at 220° C. for 2 h. In I.R. absorption spectrum of each resin, absorption peaks due to the normal melamine ring, the isomelamine ring and the guanidine bond were recognized at 1590 cm$^{-1}$, 1620 cm$^{-1}$ and 1660 cm$^{-1}$, respectively. It was confirmed that the resulting cured products had the above-mentioned structures [I] and [II].

When the same cyanamide compounds as in Examples 4 and 5 were used alone (i.e. without the diamines) for the preparation of the prepolymers and they were molded in the same manner as in the above examples, the molding materials were too brittle to form plates.

The properties of the laminates obtained in Examples 1 to 3 and the resin plates obtained in Examples 4 and 5 are shown in Table 1. In Table 1, weight reduction starting temperature was determined by heating a sample at a temperature rise rate of 4° C./min in air and weight loss at 500° C. is a rate of weight loss determined when the temperature reached 500° C. Bending strength is a ratio of the bending strength at a given temperature to that at 20° C. Bending strength after deterioration shows a ratio of the bending strength after deterioration by heating in air at 220° C. for a given time to the initial one. The data in Comparative Example 4 given in Table 1 show the results of the examination of a polyaminobismaleimide resin laminate having 1 mm thickness.

TABLE 1

| Item | Sample Example | | | | | Conventional Example 4 |
|---|---|---|---|---|---|---|
| | 1 | 2 | 3 | 4 | 5 | |
| Wt. reduction starting temp. (°C.) | 435 | 425 | 425 | 450 | 430 | 395 |
| Wt. loss at 500° C. (%) | 10 | 12 | 10 | 8 | 11 | 23 |
| Glass transition temp. (°C.) | 240 | 245 | 245 | 250 | 240 | 220 |
| Bending strength (%) | | | | | | |
| 100° C. | 92 | 90 | 90 | 94 | 92 | 85 |
| 150° C. | 90 | 88 | 86 | 90 | 88 | 80 |
| 180° C. | 86 | 82 | 81 | 84 | 82 | 75 |
| 220° C. | 78 | 76 | 75 | 77 | 76 | 60 |
| Bending strength after deterioration (%) | | | | | | |
| 500 hours | 100 | 100 | 100 | 100 | 100 | 100 |
| 1000 hours | 95 | 90 | 94 | 96 | 92 | 75 |
| 1500 hours | 85 | 80 | 85 | 86 | 84 | 68 |
| 2000 hours | 79 | 75 | 78 | 77 | 76 | 58 |

(Temp.: 20° C.)

Conventional Example 5

4,4'-dicyanamidodiphenylmethane: 80 parts by weight (0.32 mol)

diethylenetriamine: 2.9 parts by weight (0.028 mol) . . . 8.7 molar %

The above two components were dissolved in 83 parts by weight of methyl ethyl ketone and were reacted at 60° to 80° C. for 60 min. A large amount of an insoluble matter was precipitated in methyl ethyl ketone. In the I.R. absorption spectrum of the insoluble matter, a peak due to the isomelamine ring was recognized at 1620 cm$^{-1}$. It was confirmed that the impurity was a polymer formed by a trimerization reaction.

Conventional Example 6

The same procedure as in Conventional Example 5 was repeated except that diethylenetriamine was replaced with 1,3,5-tris(3-dimethylaminopropyl)-hexahydro-1,3,5-triazine (8.7 molar %). A large amount of an insoluble matter was precipitated in methyl ethyl ketone. In the I.R. absorption spectrum of the insoluble matter, a peak due to the isomelamine ring was recognized at 1620 cm$^{-1}$. It was confirmed that the impurity was a polymer formed by a trimerization reaction.

Conventional Example 7

The same procedure as in Conventional Example 5 was repeated except that diethylenetriamine was replaced with tetramethylguanidine (8.7 molar %). A large amount of an insoluble matter was precipitated in methyl ethyl ketone. In the I.R. absorption spectrum of the insoluble matter, a peak due to the isomelamine ring was recognized at 1620 cm$^{-1}$. It was confirmed that the impurity was a polymer formed by a trimerization reaction.

Example 6

(a)

4,4'-dicyanamidodiphenylmethane: 49 parts by weight (0.20 mol)

(b)

4,4'-dicyanamidodiphenyl ether: 49 parts by weight (0.20 mol)

(c)

4,4'-diaminodiphenylmethane: 2 parts by weight (0.01 mol)

The above three components were dissolved in 100 parts by weight of methyl ethyl ketone and were pre-reacted at 60° to 80° C. for 20 min to obtain a prepolymer varnish.

Example 7

(a)

4,4'-dicyanamidodiphenylmethane: 70 parts by weight (0.28 mol)

(b)

3,3'-dicyanamidodiphenyl sulfone: 26 parts by weight (0.09 mol)

(c)

4,4'-diaminodiphenyl ether: 4 parts by weight (0.02 mol)

The above three components were dissolved in a solvent mixture comprising 50 parts by weight of methyl ethyl ketone and 50 parts by weight of methyl cellosolve and were pre-reacted at 60° to 80° C. for 30 min to obtain a prepolymer varnish.

Example 8

(a)

4,4'-dicyanamidodiphenyl ether: 70 parts by weight (0.28 mol)

(b)

phenylcyanamide: 25 parts by weight (0.21 mol)

(c)

4,4'-methylenebis(2-dichloroaniline): 5 parts by weight (0.02 mol)

The above three components were dissolved in a solvent mixture comprising 50 parts by weight of methyl ethyl ketone and 50 parts by weight of methyl cellosolve and were pre-reacted at 60° to 80° C. for 30 min to obtain a prepolymer varnish.

Example 9

100 parts by weight of the prepolymer obtained in Example 4 was mixed with 0.2 parts by weight of 2-ethyl-4-methylimidazole to obtain a homogeneous mixture. The mixture could be fusion-molded even after storage for longer than three months.

Example 10

(a)

4,4'-dicyanamidodiphenylmethane: 70 parts by weight (0.28 mol)

(b)

phenylcyanamide: 20 parts by weight (0.17 mol)

(c)

4,4'-diaminodiphenylmethane: 10 parts by weight (0.05 mol)

The above three components were fusion-reacted at 100° to 130° C. for 30 min to obtain a resinous product. The resinous product could be fusion-molded even after storage for longer than three months.

Each of the resinous products obtained in Examples 9 and 10 was charged in a mold at 170° C. and heated for 30 min to obtain a transparent resin plate having 2 mm thickness. Then, the resin plates were post-cured at 220° C. for 2 h.

The properties of the laminates and resin plates obtained in Examples 6 to 10 were examined to obtain the results shown in Table 2.

TABLE 2

| Item | Sample Example | | | | |
|---|---|---|---|---|---|
| | 6 | 7 | 8 | 9 | 10 |
| Wt. reduction starting temp. (°C.) | 445 | 440 | 425 | 440 | 435 |
| Wt. loss at 500° C. (%) | 7 | 10 | 11 | 11 | 7 |
| Bending strength (%) | | | | | |
| 100° C. | 94 | 92 | 90 | 96 | 90 |
| 150° C. | 90 | 87 | 86 | 91 | 87 |
| 180° C. | 85 | 82 | 80 | 87 | 83 |
| 220° C. | 78 | 76 | 75 | 80 | 77 |
| Bending strength after deterioration (%) | | | | | |
| 500 hours | 100 | 100 | 100 | 100 | 100 |
| 1000 hours | 96 | 92 | 92 | 92 | 94 |
| 1500 hours | 87 | 84 | 81 | 82 | 84 |
| 2000 hours | 78 | 76 | 75 | 76 | 77 |

Example 11

(a)

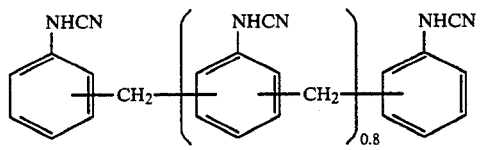

(b)

4,4'-diaminodiphenylmethane: 4 parts by weight (0.02 mol)

The above two components were dissolved in 100 parts by weight of methyl ethyl ketone and were pre-reacted at 60° to 80° C. for 40 min to obtain a prepolymer. The resulting varnish had a pot life of longer than 10 days.

Example 12

(a)

4,4'-dicyanamidodiphenylmethane: 60 parts by weight (0.24 mol)

4,4'-dicyanamidodiphenyl ether: 40 parts by weight (0.16 mol)

(b)

4,4'-diaminodiphenylmethane: 1.6 parts by weight (0.008 mol)

The above three components were dissolved in 100 parts by weight of methyl ethyl ketone and were pre-reacted at 60° to 80° C. for 50 min to obtain a prepolymer.

Comparative Example (a)

1,4-dicyanamidocyclohexane: 90 parts by weight (0.56 mol)

(b)

4,4'-diaminodiphenylmethane: 10 parts by weight (0.05 mol)

The above two components were dissolved in 100 parts by weight of methyl ethyl ketone and were pre-reacted at 50° to 60° C. for 20 min to obtain a prepolymer.

Laminates having about 1 mm thickness were prepared using the varnishes obtained in Examples 11 and 12 and the Comparative Example in the same manner as in Example 1.

The properties of the laminates obtained in Examples 11 and 12 and the Comparative Example were examined to obtain the results shown in Table 3.

TABLE 3

| Item | Sample Example 11 | Sample Example 12 | Comp. Example |
|---|---|---|---|
| Wt. reduction starting temperature (°C.) | 435 | 440 | 405 |
| Wt. loss at 500° C. (%) | 12 | 8 | 20 |
| Glass transition temperature (°C.) | 250 | 245 | 235 |
| Bending strength (%) | | | |
| 100° C. | 90 | 90 | 86 |
| 150° C. | 88 | 86 | 82 |
| 180° C. | 81 | 82 | 78 |
| 220° C. | 77 | 76 | 70 |
| Bending strength after deterioration (%) | | | |
| 500 hours | 100 | 100 | 100 |
| 1000 hours | 95 | 96 | 88 |
| 1500 hours | 84 | 85 | 78 |
| 2000 hours | 77 | 78 | 70 |

Conventional Example 5

4,4'-dicyanamidodiphenylmethane: 80 parts by weight (0.32 mol)
diethylenetriamine: 2.9 parts by weight (0.028 mol) . . . 8.7 molar %

The above two components were dissolved in 83 parts by weight of methyl ethyl ketone and were reacted at 60° to 80° C. for 60 min. A large amount of an insoluble matter was precipitated in methyl ethyl ketone.

In the I. R. absorption spectrum of the insoluble matter, a peak due to the isomelamine ring was recognized at 1620 cm$^{-1}$. It was recognized that the impurity was a prepolymer formed by a trimerization reaction.

Conventional Example 6

The same procedure as in Conventional Example 5 was repeated except that diethylenetriamine was replaced with 1,3,5-tris(3-dimethylaminopropyl)hexahydro-1,3,5-triazine (8.7 molar %). A large amount of an insoluble matter was precipitated in methyl ethyl ketone. In the I. R. absorption spectrum of the insoluble matter, a peak due to the isomelamine ring was recognized at 1620 cm$^{-1}$. It was confirmed that the impurity was a polymer formed by a trimerization reaction.

Conventional Example 7

The same procedure as in Conventional Example 5 was repeated except that diethylenetriamine was replaced with tetramethylguanidine (8.7 molar %). A large amount of an insoluble matter was precipitated in methyl ethyl ketone. In the I. R. absorption spectrum of the insoluble matter, a peak due to the isomelamine ring was recognized at 1620 cm$^{-1}$. It was confirmed that the impurity was a polymer formed by a trimerization reaction.

The resins were taken out from the resin plates obtained according to Examples 1 to 5 which had been cured at 220° C. for 2 h. In the I. R. absorption spectrum of each resin, absorption peaks due to the normal melamine ring, the isomelamine ring and the guanidine bond were recognized at 1590 cm$^{-1}$, 1620 cm$^{-1}$ and 1660 cm$^{-1}$, respectively. It was confirmed that the resulting cured products had the above-mentioned structures [I] and [II].

What is claimed is:

1. A heat-resistant resin containing structural units of the following formulae [I] and [II]:

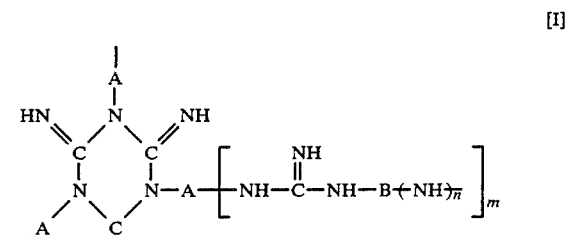

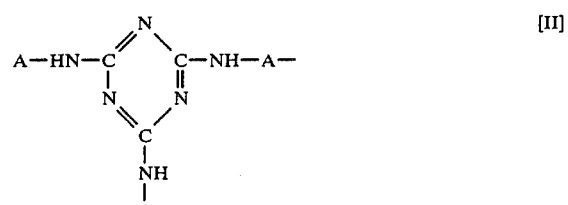

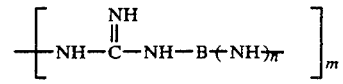

wherein A and B each represents divalent organic group having at least one aromatic ring and m and n each represents a number of at least 1.

2. A thermosetting composition containing the following components (a) and (b):
   (a) an aromatic cyanamide compound of the general formula [III]:

NCHN—A—NHCN)$_m$   [III]

wherein A represents a polyvalent organic group having at least one aromatic ring and m represents a number of at least 1, and
   (b) an aromatic amine compound of the general formula [IV]:

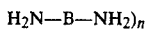 [IV]

wherein B represents a polyvalent organic group having at least one aromatic ring and n represents a number of at least 1.

3. A thermosetting composition according to claim 2 wherein m in the general formula [III] is up to 6 and n in the general formula [IV] is up to 5.

4. A thermosetting composition according to claim 3 wherein the molar ratio of the aromatic amine compound to the aromatic cyanamide compound is 1/1 to 1/50.

5. A prepolymer obtained by heating and pre-reacting a composition containing the following components (a) and (b):

(a) an aromatic cyanamide compound of the general formula [III]:

 [III]

wherein A represents a polyvalent organic group having at least one aromatic ring and m represents a number of at least 1, and (b) an aromatic amine compound of the general formula [IV]:

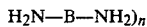 [IV]

wherein B represents a polyvalent organic group having at least one aromatic ring and n represents a number of at least 1; said prepolymer being represented by the formula:

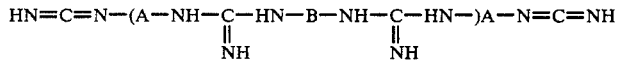

wherein B represents a polyvalent or organic group having an aromatic ring.

6. A prepolymer according to claim 5 obtained by heating the aromatic cyanamide compound to form a first prepolymer, adding the aromatic amine compound to the first prepolymer, heating the mixture of the first prepolymer and the added amine compound to obtain the prepolymer represented by the formula:

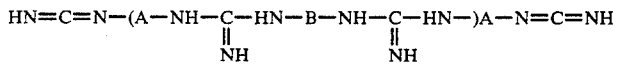

wherein A, B and n have the same meanings as previously defined.

7. A prepolymer according to claim 5 wherein m in the general formula [III] is a number of up to 6 and n in the general formula [IV] is a number of up to 5.

8. A prepolymer according to claim 6 wherein m in the general formula [III] is a number of up to 6 and n in the general formula [IV] is a number of up to 5.

9. A prepolymer according to claim 7 wherein the molar ratio of the aromatic amine compound to the aromatic cyanamide compound is 1/1 to 1/50.

10. A prepolymer according to claim 8 wherein the molar ratio of the aromatic amine compound to the aromatic cyanamide compound is 1/1 to 1/50.

11. A prepolymer according to claim 5, wherein said aromatic cyanamide compound is m-phenylene dicyanamide, phenylene dicyanamide, 4,4'-dicyanamidodiphenylmethane, 2,2'-bis(4-cyanamidophenyl)propane, 4,4'-dicyanamidodiphenyl oxide, 4,4'-dicyanamidodiphenyl sulfone, bis(4-cyanamidophenyl)phosphine oxide, bis(4-cyanamidophenyl)phenylphosphine oxide, bis(4-cyanamidophenyl)methylamine, 1,5-dicyanamidonaphthalene, m-xylene dicyanamide, 1,1-bis(p-cyanamidophenyl)phthalan, p-xylene dicyanamide, hexamethylene dicyanamide, 6,6'-dicyanamido-2,2'-dipyridyl, 4,4'-dicyanamidobenzophenone, 4,4'-dicyanamidoazobenzene, bis(4-cyanamidophenyl)phenylmethane, 1,1-bis(4-cyanamidophenyl)cyclohexane, 1,1-bis(4-cyanamido-3-methylphenyl)-1,3,4-oxadiazole, 4,4'-dicyanamidodiphenyl ether, 4,4'-bis(p-cyanamidophenyl)-2,2'-dithiazole, m-bis(4-p-cyanamidophenyl-2-thiazolyl)-benzene, 4,4'-dicyanamidobenzanilide, 4,4'-dicyanamidophenyl benzoate, 2,2'-bis[4-(4-cyanamidophenoxy)phenyl]propane, 2,2'-bis[3-methyl-4-(4-cyanamidophenoxy)phenyl]propane, 2,2-bis[3-ethyl-4-(4-cyanamidophenoxy)phenyl]propane, 2,2-bis[3-propyl-4-(4-cyanamidophenoxy)phenyl]propane, 2,2-bis[3-isopropyl-4-(4-cyanamidophenoxy)phenyl]propane, bis[4-(4-cyanamidophenoxy)phenyl]methane or a cyanamide-terminated sulfone ether oligomer of the general formula [IV]:

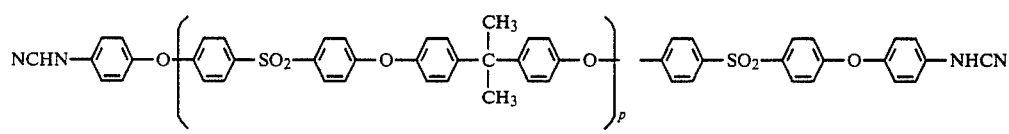

wherein p represents a number of 0 to 3 or a mixture thereof.

12. A prepolymer according to claim 11, wherein said aromatic amine compound is aniline, m-phenylenediamine, p-phenylenediamine, 4,4'-diaminodiphenylmethane, 2,2'-bis(4-aminophenyl)propane, benzidine, 4,4'-diaminodiphenyl oxide, 4,4'-diaminodiphenyl sulfone, bis-(4-aminophenyl)methylphosphine oxide, bis(4-aminophenyl)phenylphosphine oxide, bis(4-aminophenyl)methylamine, 1,5-diaminonaphthalene, m-xylylenediamine, 1,1-bis(p-aminophenyl)phthalan, p-xylylenediamine, hexamethylene diamine, 6,6'-diamino-2,2'-dipyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophen)-1,3,4- oxadiazole, 2,5-bis(m-aminophenyl)thiazole(4,5-d)thiazole, 5,5'-di(m-aminophenyl)-(2,2')-bis(1,3,4-oxadiazolyl), 4,4'-diaminodiphenyl ether, 4,4'-bis(p-aminophenyl)-2,2'-diazole, m-bis(4-p-aminophenyl-2-thiazolyl)benzene, 4,4'-diaminobenzanilide, 4,4'-diaminophenyl benzoate, N,N'-bis(4-aminobenzyl)-p-phenylenediamine, 4,4'-methylenebis(2-dichloroaniline), benzoguanamine, methylguanamine, 1,2,4-triaminobenzophenone, 3,5,3',5'-tetraaminobenzophenone, 1,2,4,5-tetraaminobenzene and an aniline resin of the general formula [VII]:

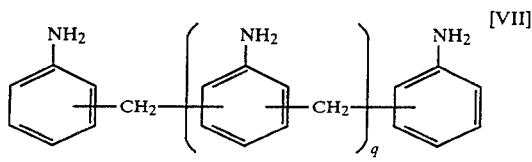

wherein q represents a number of 0, 1 to 6 or a mixture thereof.

13. A prepolymer according to claim 12, wherein the molar ratio of the aromatic amine compound to the aromatic cyanamide compound is from 1/1 to 1/50.

* * * * *